Oct. 20, 1959   J. S. BARNETT   2,909,096
PULSE OPERATED CAMERA

Filed Jan. 24, 1955   4 Sheets-Sheet 1

INVENTOR.
John S. Barnett
BY
Albert J. Frihe
ATTORNEY

Oct. 20, 1959

J. S. BARNETT 2,909,096

PULSE OPERATED CAMERA

Filed Jan. 24, 1955

INVENTOR.
John S. Barnett
BY
Albert J. Fihe
ATTORNEY

Oct. 20, 1959

J. S. BARNETT 2,909,096

PULSE OPERATED CAMERA

Filed Jan. 24, 1955

INVENTOR.
John S. Barnett
BY
Albert J. Fihe
ATTORNEY

Oct. 20, 1959
J. S. BARNETT
2,909,096
PULSE OPERATED CAMERA
Filed Jan. 24, 1955
4 Sheets-Sheet 4
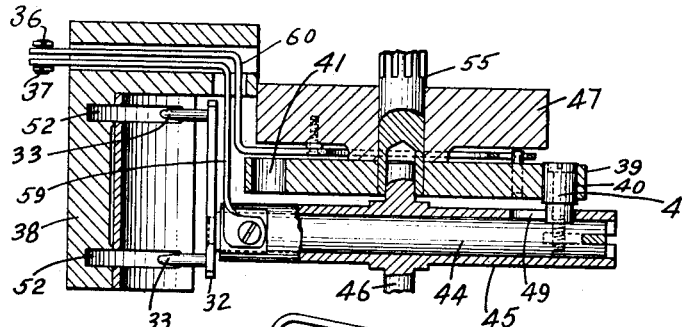
Fig. 7.
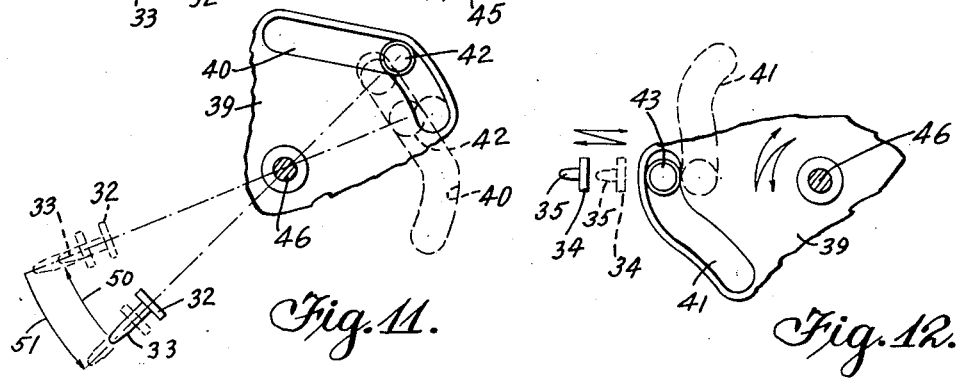
Fig. 11.
Fig. 12.
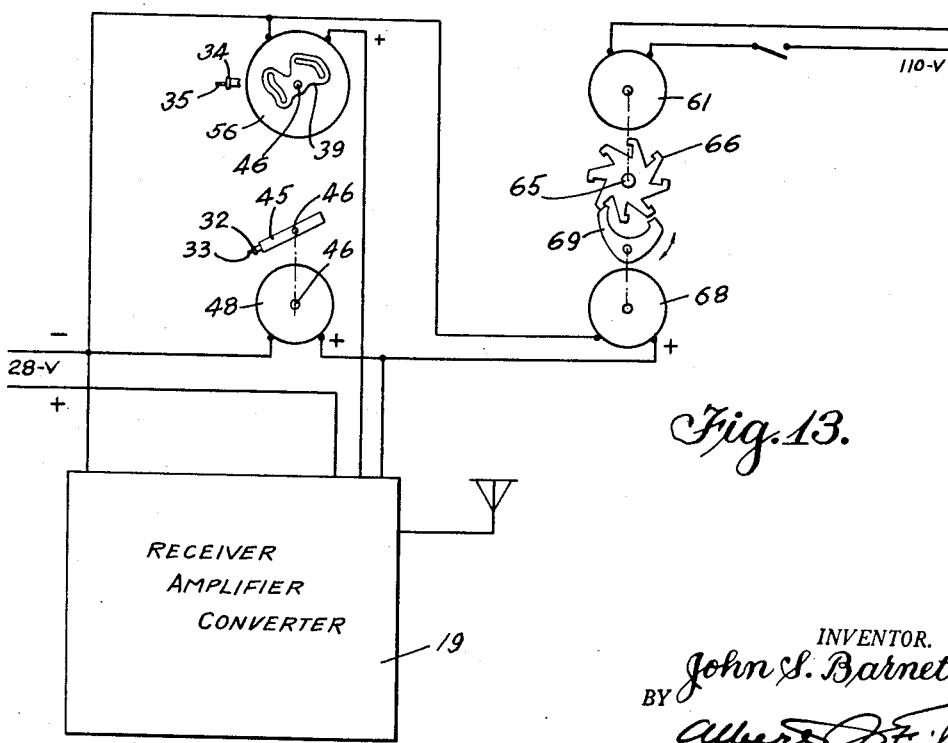
Fig. 13.
INVENTOR.
John S. Barnett
BY
Albert G. Fihe
ATTORNEY

United States Patent Office 2,909,096
Patented Oct. 20, 1959

2,909,096

PULSE OPERATED CAMERA

John S. Barnett, Los Angeles, Calif., assignor to Photographic Analysis, Inc., North Hollywood, Calif., a corporation of California Application January 24, 1955, Serial No. 483,556

15 Claims. (Cl. 88—18.4)

This invention relates to a pulse operated camera and has for one of its principal objects the provision of a device for use in a system which includes a control tape recording, editing and rerecording, particularly in checking the speed, direction and other operating characteristics of relatively fast moving objects, such as guided missiles or the like.

One of the important objects of this invention is the provision of a pulse operated camera whereby pictures may be taken either intermittently at predetermined spaced intervals or singly at variable intervals.

Another important object of the invention is to provide a pulse operated camera or the like which will efficiently handle the requirements of projectile and high speed plane research and whereby results of operations along this line will be immediately and clearly available for further study.

Another object is the provision of a device of the class described which will automatically obtain required data on high speed plane or guided missile operations and which will further automatically record accurate space and time measurements during the whole or part of such an operation.

Yet another object is to provide a system of such pulse operated cameras wherein the required observations and resultant data are practically automatically produced and substantially independent of various obscuring or interfering objects such as mountains, clouds or the like; also for triangulation purposes.

Other and further important objects of the invention will be apparent from the disclosures in the accompanying drawings and following specification.

The invention, in a preferred form, is illustrated in the drawings and hereinafter more fully described.

In the drawings:

Figure 1 is a panoramic view showing several of the impulse cameras of this invention and the means and method for operating the same to photograph and record the direction, speed and other characteristics of a fast moving object such as a guided missile or the like.

Figure 7 is likewise a sectional view of a portion of the film operating means taken on the line 7—7 of Figure 4, looking in the direction indicated.

Figure 11 is a detail view of one portion of the film operating mechanism.

Figure 12 is a detail view of another portion of said mechanism.

Figure 13 is a diagrammatic view illustrating in some detail the actual operation of the camera.

As shown in the drawings:

Figure 1:
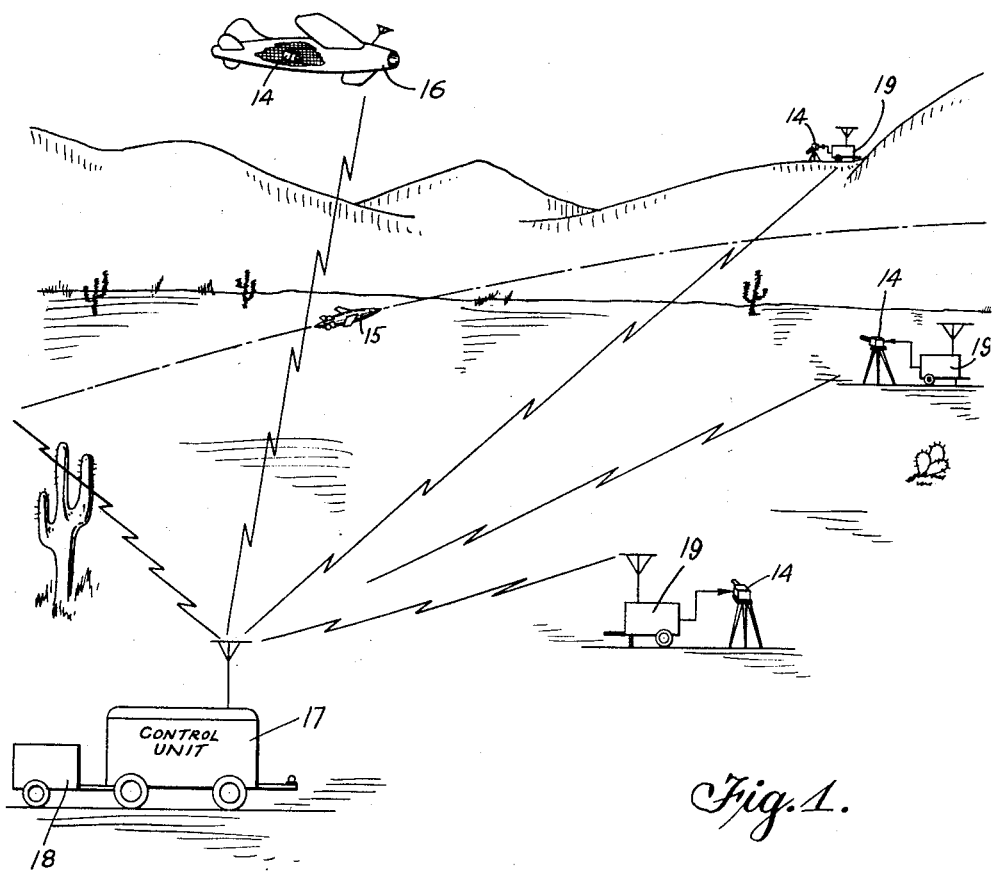

The reference numerals 14 in Figure 1 indicate generally individual impulse cameras constructed in accordance with the principles of this invention, and this figure shows the same in actual operation for photographing, tracking and recording the flight, speed and other characteristics of a guided missile 15 or the like. It will be noted that the cameras can be placed at strategic points with regard to the projected flight of the missile, either on the ground in high or low places, or one or more of these cameras can be carried in an airplane 16 which will fly over that portion of the terrain used in the operation. Obviously all of the cameras need not be of the type contemplated by this invention, because motion picture cameras and others either manually or automatically controlled may likewise be used.

This operation, however, is preferably controlled by a master unit or control station 17 having a power supply 18 which broadcasts the necessary impulses for actuating the cameras and other recording devices. Each camera is ordinarily supplied with its own source of power 19 which also includes a receiver, amplifier and converter, filter or the like, whichever can be best employed in devices of this type. The control unit 17 ordinarily includes a radio transmitter with necessary antennae and other equipment throughout the system.

Figure 2:
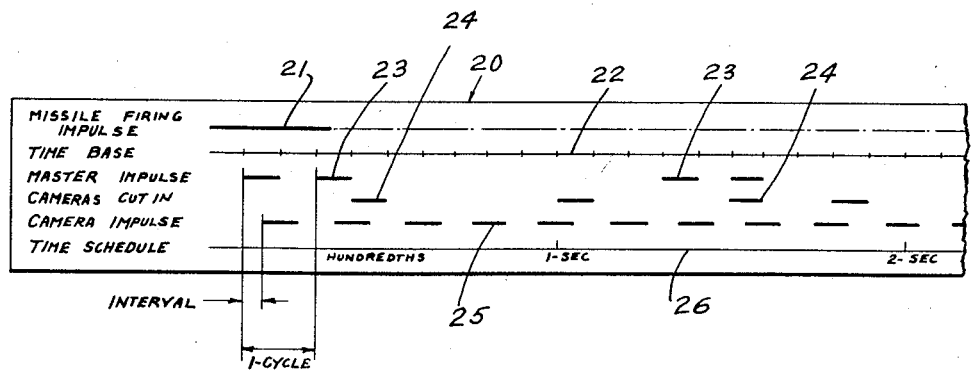
Figure 2 shows a section of the control film or track whereby the various impulse cameras of this invention are operated and controlled.
Figure 3:
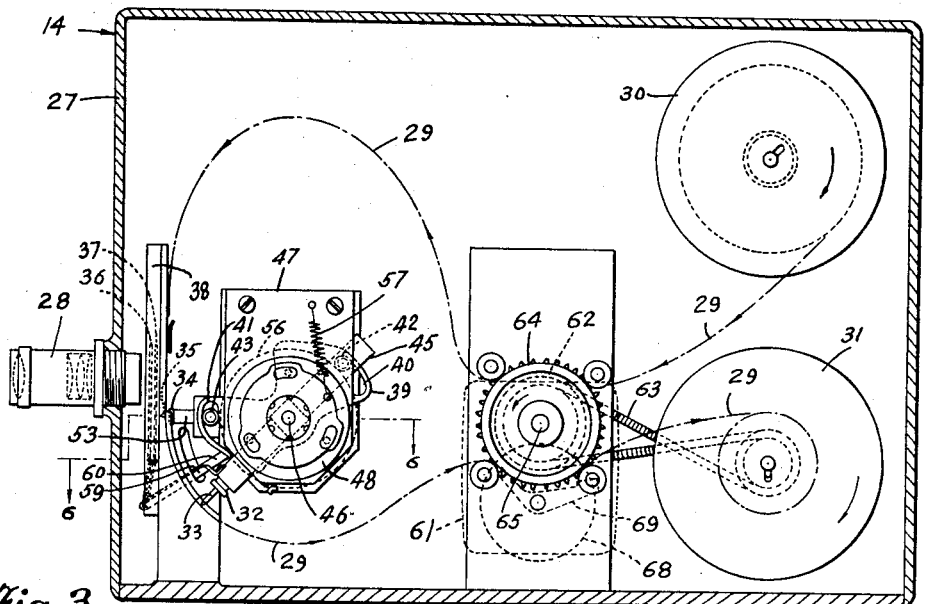
Figure 3 is a detail view of the camera itself, illustrating some of the main characteristics.

In Figure 2 is illustrated a master control track, either on film or magnetic tape, which is employed in the control unit 17, this track being indicated by the reference numeral 20 but the indicia thereon are typical only and not to scale.

There are several channels on this master control track, the first being indicated by the reference numeral 21, and this includes a pulse to be used in starting and controlling the event.

The second channel, indicated by the reference numeral 22, comprises a time base correlation for the recording film.

The third channel, indicated by the reference numeral 23, includes the master control for the pulse cameras, pulsed at the desired frequency rates per second.

The fourth channel, indicated by the reference numeral 24, includes the impulses which are used to control other types of cameras used in the operation.

The fifth channel, indicated by the reference numeral 25, controls the second operation of the pulse camera, and the sixth channel, indicated by the reference numeral 26, merely correlates the time schedule.

In the preparation of the master control track, the various channels are pre-recorded in stock footage. The control channels are then sequence edited from this stock footage into various control channels which are then recorded on one magnetic track which is held for the operation.

In operation, the individual channels of the master control track are reproduced simultaneously. All the individual signals are transmitted on one carrier frequency.

Two methods of monitoring the transmitter output signal are suggested. The output signal can be fed directly into tone filters and the individual signals fed into an oscilloscope and recorded photographically. An alternate method is the use of a field monitoring receiver, in which signals are filtered and recorded as above mentioned.

A field receiver is located at each camera position, the output of which is fed into a selective tone filter system and the necessary signals are amplified. The time base signals are fed into a selector and the selected time base signal is fed into the timing light of the camera. The camera control pulse signal is fed into a pulse selector, then into a period timer or timers which control the starting and running time of the various cameras. Additional channels can be made available in the system for coded correlation purposes.

The camera itself is in a suitable housing 27 (Figures 3–8 inclusive) having an appropriate lens 28. Film 29 is carried from one spool 30 to another spool 31 past the lens and shutters of the camera by the improved mechanism of this invention. The film is perforated along its edges for operation by a double claw 32 having pins 33. There is also a double pilot element 34 having pins 35. Co-operating with the lens 28 is a pair of focal plane shutter blades 36 and 37. These are best shown in plan view in Figures 9 and 10 and are slidably held in a suitable framework 38 in the housing 27.

The operating means for the double claw and the pilot pins comprises essentially a rotary control means in the form of a cam 39 (Figures 4, 11, 12 and 13) having cam portions in the form of internal tracks 40 and 41 and pins 42 and 43 respectively ride in these tracks. The pin 42 is for moving the claw element 32 and 33 into and out of operational contact with the holes in the film and the pin 43 is for moving the pilot element 34—35 into and out of film fixing position.

The film moving claw element 32—33 is fixed on the end of a shaft 44 (Figure 7) slidably mounted in a holder in the form of a sleeve 45 and this sleeve is supported on a rotatable shaft 46 located in a suitable support 47 forming part of the housing 27. Turning of this shaft is preferably accomplished by means of a first reversible actuator in the form of a rotary solenoid 48 (Figure 6) to which solenoid electric current is directed as controlled by the master impulse 23 (Figure 2).

Figure 6:
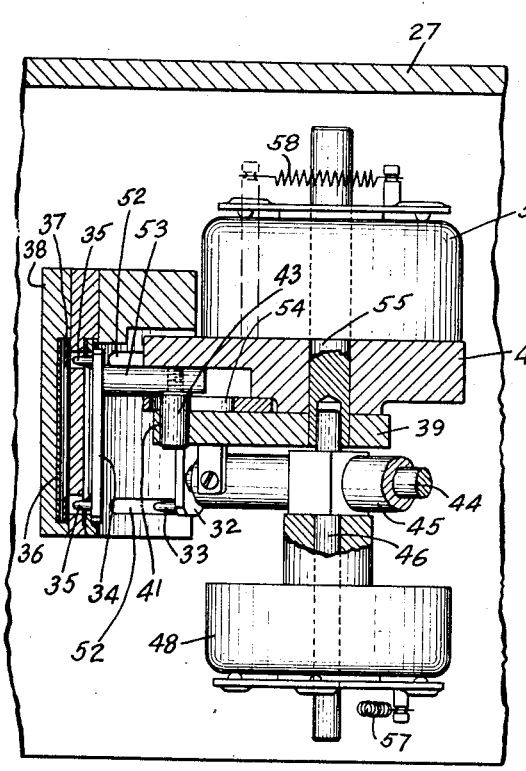
Figure 6 is a further enlarged detail view of a portion of the film operating means, this being taken on the section line 6—6 of Figure 3, looking downwardly.

The pin 42 which rides in the slot 40 of the cam 39 is fixed to the shaft 44 (Figure 7) and a slot 49 is in the sleeve 45 allowing of proper movement of the pin as controlled by the cam slot 40 and a corresponding in and out movement of the claw 32—33. This four-position movement takes place when the sleeve 45 with the claw element 32—33 is moving from the full line position shown in Figure 11 upwardly along the arc 50 to the position shown in the dotted lines in this figure, thence inwardly to one extremity of the arc 51, thence downwardly along this arc to the position shown at the end of same and finally inwardly to the point of beginning. This accomplishes first an upward motion with the claws free of the film, thence an inward motion to engage the sprocket holes in the film, then a downward motion to move the film, a frame of which has in the meantime been exposed, downwardly into position for another exposure, and finally out of contact with the film. The pins 33 move in slots 52 in a part of the framework 47 (Figures 6 and 7).

The operation of the film moving claw pins 33 and the corresponding movement of the film fixing or positioning pins 35, all as controlled by the cam 39, is fully brought out in Figures 11 and 12, and it will be noted that a single movement of the cam 39 controls corresponding and simultaneous movements of the pins 42 and 43 in their respective slots 40 and 41. The film positioning pins are in film holding position when the film moving claw 33 is in its upward movement along the arc 50, these pins 33 being at that time disengaged from the film. Conversely, the film positioning pins 35 are withdrawn from the film when the same is being moved downwardly along the arc 51 by the pins 33 after exposure to a frame.

The pilot or film positioning pins 35 are mounted on a shaft 53 slidably positioned in the framework 47 and the pin 43 which rides in the slot 41 of the cam 39 is fastened to the shaft 53 operating in a slot 54 forming part of the structure of the framework 47.

The cam 39 is mounted on a shaft 55 likewise supported in the framework 47 and this shaft is operated by a rotary solenoid 56 (Figure 6) which solenoid is also pulse controlled. The relationship of these parts is such that the solenoid 48 rotates the shaft 46 through approximately only half of the turning movement given the shaft 45 by the solenoid 56. Springs 57 and 58 act to return the solenoids and their respective shafts and connected parts to initial position when the current flow ceases.

Figure 4:
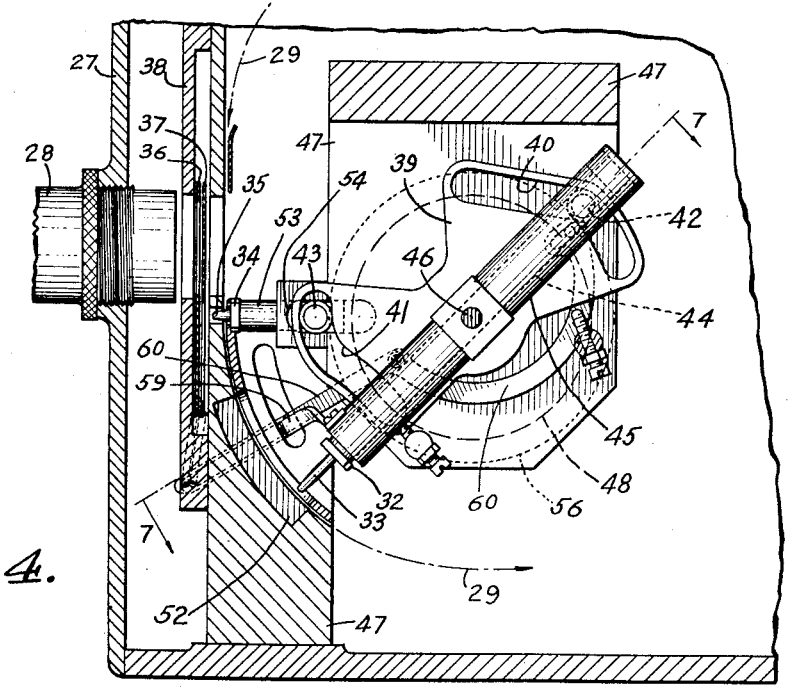
Figure 4 is an enlarged view of the film and shutter operating mechanism.

Shutter operating arms 59 and 60 respectively (Figure 7) are connected to the film moving element 45 and to the cam 39 respectively, and these arms are connected to the shutters 36 and 37 in any suitable manner, as best shown in Figure 4.

The shutter blade 37 is coupled to and operated simultaneously with the film moving claw 32 and its pins 33 and the shutter plate 36 is operated by the cam 39 through the link 60. It will be noted that the cam 39 simultaneously controls the action of the film feeding claw 32—33 and the film positioning pin element 34—35, and the slots in the cam are so correlated that a very accurate film positioning and feeding movement results with possibilities of extremely fast operation without loss of accuracy.

It is essential for proper and accurate operation that there be very little pull on the film as it moves past the lens and the shutters by the above described mechanism. For this purpose, a separate individually operated but synchronized film feeding mechanism is incorporated into the structure.

Figure 5:
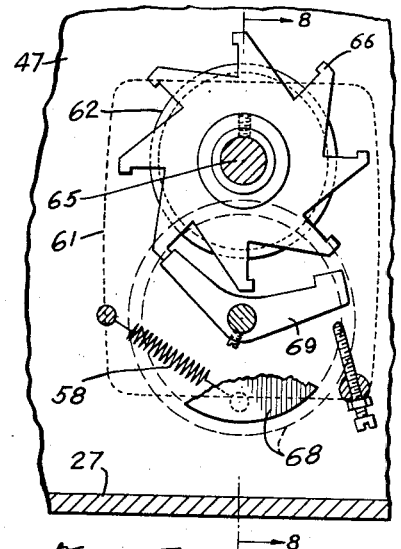
Figure 5 shows the escapement element for film feed and take-up.
Figure 8:
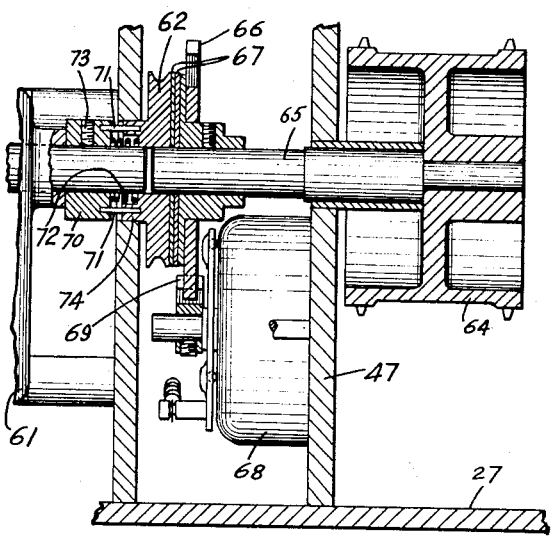
Figure 8 is a vertical section on the line 8—8 of Figure 5.
Figures 9, 10:
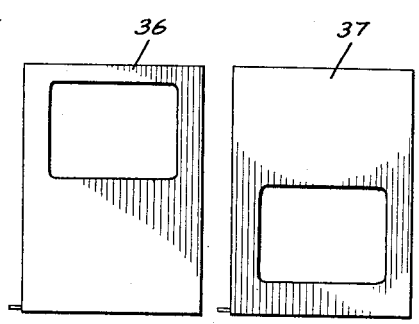
Figures 9 and 10 are views of the two shutter elements forming part of the impulse camera of this invention.

This includes a separately driven continuously operating motor 61 (Figures 5, 8 and 13). A pulley 62 is on the end of the shaft of the motor 61 and a belt 63 (Figure 3) is mounted on this pulley, this belt being for the purpose of exerting a continuous sliding pull on the reel 31 which receives the film 29 after it has been exposed. The film rides on a sprocket element 64 which is mounted on a shaft 65 in alignment with the shaft of the motor 61 and an escapement sprocket 66 is fixed on this shaft adjacent the pulley 62. A series of friction discs 67 or the like, operating as a slip clutch, is between the pulley 62 and the escapement sprocket 66.

The pulley 62 has an integral hub 74, this being of sufficient size to receive the aligned and abutting ends of the shaft of the motor 61, and the shaft 65 which supports the film feeding sprocket 64. A collar 70 is fixed on to the shaft of the motor 61 by means of a set screw 73 and a plurality of pins 71 are fitted into corresponding recesses in the collar 70. These pins slidably project into related openings in the hub 74 of the pulley 62 and a helical spring 72 surrounds the end of the shaft of the motor 61 and is placed in a recess in the adjacent end of the hub 74 of the pulley 62. This spring exerts a constant torque or pressure on the pulley 62 and the shaft 65 through the clutch discs 67.

A rotary solenoid 68, which is in electrical synchronization with the solenoids 48 and 56, is mounted below the shaft 65 and the shaft of this solenoid carries a rocker arm 69 which is in operative engagement with the escapement sprocket 66.

Accordingly, each time the solenoid 68 is operated, the rocker arm 69 allows a corresponding step by step movement of the escapement 66 and a resultant forward feed of the film 29 on the top of the sprocket 64 amounting to one frame. A corresponding feed of the film from beneath the sprocket also results in rewinding on to the reel 31, due to the constant pull of the belt 63. In this manner, absolute freedom of movement of the film past the lens 28 and with regard to the shutters 36 and 37 is assured, while at the same time, proper unwinding and rewinding results.

The motor 61 is preferably driven by current of 110 volts and the solenoids 48, 56 and 68 are preferably operated by 28 volt current, but obviously this is subject to any desired and necessary changes.

So far as synchronization is concerned, it will be noted that there is an instantaneous response and a corresponding film exposure to the operating pulse. This is due to the fact that the first pulse causes the claw 33 to rise, aligning a corresponding aperture with the lens before any other portion of the camera will move. This characteristic allows a very high degree of synchronization of exposure to exist between a group of such cameras, such obviously being a necessary requirement in instrumentation for proving ranges and the like.

By controlling the relation between the pulses which are fed to the two solenoids 48 and 56, the exposure may be varied, since the movement of the claw solenoid 48 opens the shutter 37 and the movement of the cam solenoid 56 closes the opening by moving the shutter blade 36.

The construction is such that the camera of this invention should operate at a maximum pulse speed of between twenty and thirty or more frames per second.

The pilot pins 34—35 will guarantee accurate film positioning during exposure. This is of great importance in scientific photography of this type where accurate measurement of the position of objects in the image must be had in succeeding frames.

As previously stated, the rotary solenoid 48 swings the claw shaft 44 through an angular range which is approximately one half of the angular range of movement of the cam 39.

Figure 11 shows in broken lines the limits of the angular range of movement of the claw pins 33. The range of angular movement of the cam 39 is twice this range and it is apparent in Figure 11 that the angular extent of the cam track 40 is even greater. In fact, the angular extent of the cam track 40 must be at least equal to the sum of the angular range of the claw pins 33 and the angular range of movement of the cam 39. This relatively great extent of the cam track 40 is necessary because the cam track 40 must be long enough to permit the full range of angular movement of the claw pins when the cam is at one of its two positions and the claw pins are retracted and the cam track must also be long enough to permit the full range of angular movement of the claw pins when the cam is at its second position with the claw pins extended. This fact and the cooperating relationships among the moving parts of the mechanism may be appreciated by reviewing in detail the four stages of the operating cycle.

At the start of the operating cycle, the shutter blade 37 which may be termed the first shutter is in its normal down position masking the lens aperture and the shutter blade 36 which may be termed the second shutter is in its normal down position which may be termed its unmasking position since the shutter does not close the lens aperture. The shaft 44 which together with the claw pins 33 may be termed the claw member is held by the holder or sleeve 45 at the position shown in Figure 4 and the cam 39 is also at the position shown in Figure 4. This starting position of the claw member is the position represented by the claw pins 33 in Figure 11 and may be termed the forward position of the claw member since the claw member moves downward to this position to advance the film. Thus, the alternate position of the claw pins 33 shown in dotted lines in Figure 11 may be termed the rearward position of the claw member. The normal or first position of the cam 39 is indicated in full lines in Figures 4 and 11 and the alternate second position is indicated by the dotted position of the cam track 40 in Figure 11. The pilot pins 35 are extended into engagement with the film. It will be noted in Figure 4 that the follower pin 43 that controls the pilot pins 35 is at the end of the cam slot 41 and that the follower pin 42 for the claw member is at an intermediate point of the cam track 40. The cam track 40 has a right-hand dwell as viewed in Figure 4 to hold the claw member retracted and has a left-hand dwell to hold the claw member extended.

The first stage of the operating cycle is carried out by energization of the solenoid 48, the solenoid 68 being energized at the same time since it is in parallel with the solenoid 48 as may be seen in the wiring diagram of Figure 13. This simultaneous energization of the solenoid 68 causes an increment of film to be fed to the film loop as heretofore explained. The energization of the solenoid 48 causes the sleeve or holder 45 to swing the retracted claw member upward through the arc 50 in Figure 11 from the forward or down position of the claw member to its rearward position with respect to the direction of film travel. The shutter 37 is operatively interlocked with the sleeve 44 so that energization of the solenoid 48 also causes the shutter 37 to move upward to place both shutters in their unmasking positions for exposure of the film. During this upward swinging movement of the claw member, the follower pin 44 traverses the right-hand dwell of the cam track 40 to keep the claw member retracted, and, of course, this dwell must be of adequate length to permit this action while the cam 39 is stationary.

The second stage of the operating cycle is carried out by energization of the solenoid 56 while the solenoid 48 is still energized. The solenoid 56 rotates the cam 39 through twice the range of angular movement of the claw member to cause the claw member to be extended into engagement with the film. It is apparent that the greater rotation by the cam 39 is required because the full length of the right-hand dwell of the track 40 must be traversed to bring the transition to the second dwell in operation to extend the claw member. Actually about two-thirds of the angular extent of the cam track 40 passes the follower pin 42 of the claw member. This rotation of the cam 39 also causes the second cam track 41 to retract the pilot pins 35 to free the film for advance by the claw member. Since the second shutter 36 is operatively interlocked with the cam 39, this rotation of the cam 39 by the solenoid 56 results in upward movement of the second shutter to its masking position to terminate the exposure of the film.

The third stage of the operating cycle is carried out by de-energization of the solenoid 48 while energization of the solenoid 56 is continued. When the solenoid 48 is de-energized, the corresponding solenoid spring 57 returns the claw member to its forward position and thereby advances the film. The solenoid 48 may be termed a reversible actuator in which electromagnetic operating means causes operation in one direction and opposing spring means causes operation in the reverse direction. In this return movement of the claw member the pin 42 traverses the left-hand dwell of the cam track 40 to maintain the claw member in its extended position. Since the shutter 37 is operatively interlocked with the claw member, the de-energization of the solenoid 48 returns the shutter to its normal masking position.

The fourth stage of the operating cycle is carried out by finally deenergizing the solenoid 56 to permit the spring 58 to return the cam 39 to its normal starting or first position. Consequently, the cam track 41 extends the pilot pins 35 into engagement with the film and the cam track 40 acting on the pin 42 retracts the claw member from engagement from the film. At the same time, the second shutter 36 is lowered to its unmasking normal starting position.

It is to be noted that this operating cycle is accomplished merely by energizing and de-energizing two solenoid circuits. Thus, the whole operating cycle may be remotely controlled solely by two pulses of current that overlap in time. The duration of the overlap of the two pulses, i.e. the time interval between the initial energization of the solenoid 48 and the initial energization of the solenoid 56 determines the duration of the time interval during which the film is exposed. Thus, variable exposure of the film in the camera by remote control by merely varying the time relation between the two pulses of current in the two solenoid circuits.

The action of the camera of this invention can be reversed, and this possibility can often be used to advantage whenever the mechanism is used as part of a projector, particularly if the operator wishes to run back to a certain frame or frames of the film. Such reversal is practically instantaneous because the movement has very little inertia per se which would have to be decelerated, completely stopped and then accelerated. Intermittent operation is also obviously very possible whenever desired.

Cameras of this type can advantageously be used in combination with a theodolite mount for tracking missiles (Figure 1). Usually two or more cameras are employed. In installations of this type, the camera is ordinarily equipped with a data box which records the azimuth, elevation and time on the edge of the film. The usual manner of operation in installations of this type includes generation of the pulses at the master control position 17, which are then sent over the ground lines or transmitted by radio to the various camera positions 14 where they are amplified by local power 19 and fed into the cameras.

Cameras constructed in accordance with the principles of this invention may also be employed to photograph instrument panels and the like. In such cases, the camera may be pulsed by a suitable intervalometer or by pulses transmitted from a master control. Where simultaneous records of instrument readings on widely separated panels are required, the synchronizing feature of the camera of this invention is of great value and here again the data recording box may be used.

To photograph totals, sub-totals and the like on mechanical or electronic calculating devices, a pulse generated by the machine will operate the camera.

In the recording of instrument readings and performance of component parts in robot planes and guided missiles, the camera may be operated by an intervalometer or by a radio link with a pulse generator on the ground or elsewhere, and such cameras may be then automatically ejected and lowered by means of parachutes.

It will be evident that herein is provided a pulse operated camera which may be employed to advantage in the recording of any phenomenon or operation such as the moving parts of various machines or in construction progress. Cloud movements, certain aspects of assembly lines and even sporting events and identification of people in public places or the like can be accomplished. The frequency of exposure may be controlled by a suitable intervalometer or random exposures can be made manually or by some photoelectric control.

I am aware that many changes may be made and numerous details of construction varied throughout a wide range without departing from the principles of this invention, and we therefore do not propose limiting the patent granted hereon otherwise than as recited in the appended claims.

I claim as my invention:

1. In an optical device such as a camera or projector having means to guide a film along a predetermined path past a lens aperture, a mechanism to advance the film and control the passage of light between the lens aperture and the film, said mechanism comprising: a film advancing claw member mounted to be rotatable about a given pivot axis through a given angular range from a rearward position to a forward position along said path to advance the film, said claw member being extensible and retractable laterally of said axis for engagement and disengagement with the film; pilot pin means adjacent said path movable between an extended position in engagement with the film to immobilize the film and a retracted position to free the film; oscillatory rotary control means mounted to be rotatable about said given pivot axis with means connecting said claw member and said pin means to said control means to effect guided movement of said claw member and said pin means upon rotation of said control means about said given pivot axis from a first position to a second position to extend said claw member and retract said pin means and in the opposite direction from said second position to said first position to retract said claw member and extend said pin means; a first shutter operatively interlocked with said claw member to move from a masking position to an unmasking position with respect to said lens aperture when said claw member rotates from its forward position to its rearward position and vice versa; and a second shutter operatively interlocked with said rotary control means for movement from an unmasking position to a masking position with respect to said aperture when said rotary control means rotates from its first position to its second position and vice versa; and means to rotate said claw member and said rotary control means alternately in opposite directions to carry out an operating cycle of four stages to advance the film and to control the passage of light between the film and the aperture, the four stages comprising, respectively, rotation of said claw member from its forward position to its rearward position while said rotary control means is at its first position to move said first shutter to its unmasking position to permit passage of light between the lens aperture and the film; rotation of said rotary control means from its first position to its second position while said claw member is at its rearward position to extend said claw member, retract said pilot pin means and move said second shutter to its masking position to cut off the passage of light; return of said claw member from its rearward position to its forward position while said rotary control means is at its second position, to advance said film and move said first shutter to its masking position; and return of said rotary control means from its second position to its first position while said claw member is at its forward position to extend said pilot pin means, retract said claw member and move said second shutter to its unmasking position.

2. In an optical device such as a camera or projector having means to guide a film along a predetermined path past a lens aperture, a mechanism to advance the film and control the passage of light between the lens aperture and the film, said mechanism comprising: a film advancing claw member mounted to be rotatable about a given pivot axis through a given angular range from a rearward position to a forward position along said path to advance the film, said claw member being extensible and retractable for engagement and disengagement with the film; pilot pin means adjacent said path movable between an extended position in engagement with the film to immobilize the film and a retracted position to free the film; rotary control means mounted to be rotatable about said given pivot axis with means connecting said claw member and said pin means to said control means to effect guided movement of said claw member and said pin means upon rotation of said control means about said given pivot axis from a first position to a second position to extend said claw member and retract pin means and from said second position to said first position to retract said claw member and extend said pin means; a first shutter and a second shutter, each movable between a masking position closing said aperture and an unmasking position; a first reversible actuator operatively connected to said claw member and said first shutter to swing said claw member from its forward position to its rearward position and simultaneously move said first shutter from its masking position to its unmasking position and vice versa; and a second reversible actuator operatively connected to said rotary control means and said second shutter to turn said control means from its first position to its second position and simultaneously to move said second shutter from its unmasking position to its masking position and vice versa, whereby the mechanism is operable through a cycle of four stages to advance the film and control said passage of light, the four stages comprising, respectively, operation of said first actuator to move said first shutter to its unmasking position to permit passage of light between the lens aperture and the film; operation of said second actuator to extend said claw member, retract said pilot pin means and move said second shutter to its masking position to cut off the passage of light; reverse operation of said first actuator to advance said film and move said first shutter to its masking position; reverse operation of said second actuator to extend said pilot pin means, retract said claw member and move said second shutter to its unmasking position.

3. A mechanism as set forth in claim 2 in which said two actuators comprise rotary solenoids.

4. A mechanism as set forth in claim 2 in which said film is formed in a loop and which includes means to feed the film intermittently to the loop, said feed means being actuated by a third rotary solenoid operable synchronously with one of said two first mentioned solenoids.

5. A mechanism as set forth in claim 2 in which said first actuator includes a first electromagnetic operating means together with an opposing first spring means and said second actuator includes a second electromagnetic operating means together with an opposing second spring means, whereby said cycle may be carried out by energizing said first electromagnetic means for the first stage continuing the energization of said first electromagnetic means and energizing said second electromagnetic means for the second stage, continuing energization of said second electromagnetic means and de-energizing said first electromagnetic means for the third stage, and de-energizing said second electromagnetic means for the fourth stage, with the duration of the passage of light between the lens aperture and the film determined by the time interval between the energization of said first electromagnetic means and the subsequent energization of said second electromagnetic means.

6. A mechanism as set forth in claim 5 in which said film is formed in a loop and which includes: means to feed the film intermittently to the loop; a third electromagnetic means to actuate said feed means; a first circuit to energize said first electromagnetic means; and a second circuit to energize said second electromagnetic means, said third electromagnetic means being in one of said circuits for energization simultaneously with the corresponding electromagnetic means therein.

7. A mechanism for intermittently advancing a ribbon-like strip having sprocket holes therein, comprising: a claw member; a rotary holder having a given axis of rotation, said claw member being movably mounted on said holder for extension and retraction laterally of said axis to engage and disengage said strip, said holder being oscillative through a given angular range to swing said claw member between a rearward position and a forward position to advance the strip; means to oscillate said holder between said two positions; pilot pin means adjacent said path movable between an extended position in engagement with the strip to immobilize the strip and a retracted position to free the strip; and a rotary cam means rotatable on said given axis through a greater angular range than said given angular range from a first position to a second position to extend said claw member and retract said pin means and from said second position to said first position to retract said claw member and extend said pin means, said cam means having a cam portion for cooperation with said claw member of greater angular extent than said angular range of the holder, said cam portion having a dwell positioned and dimensioned to hold said claw member retracted when said claw member swings from its forward position to its rearward position while the cam means is at its first position and having a second dwell positioned and dimensioned to hold said claw member extended when said claw member swings from its rearward position to its forward position while said cam means is at its second position.

8. A combination as set forth in claim 7 in which said angular range of the rotary cam means is approximately twice said given angular range.

9. A mechanism as set forth in claim 7 in which the angular extent of said cam portion is at least equal to the sum of said given angular range of the holder and said greater range of the rotary cam means.

10. A mechanism as set forth in claim 7 in which said cam means has two diametrically opposite cam portions cooperating respectively with said claw member and said pilot pin means.

11. A mechanism as set forth in claim 10 in which said cam portions are cam slots, said claw member and said pilot pin means having pins extending into said cam slots.

12. A mechanism for intermittently advancing a ribbon-like strip comprising: means mounted to be movable laterally of the strip along a given path between an extended position to engage and immobilize the strip and a retracted position freeing the strip for advance; means to advance the strip by a given increment including a member mounted to be rotatable about a given pivot axis between rearward and forward positions and be extensible and retractable laterally of said axis; a first rotary means oscillative about said given pivot axis through a given arc and connected to said strip engaging means to effect guided movement of said strip engaging means upon oscillative movements of said first rotary means to extend and retract said strip engaging means; a second rotary means oscillative about said given pivot axis through a given arc and connected to said advancing means to operate said member between said rearward and forward positions, said first rotary means being connected to said advancing means to effect guided extension and retraction movements of said member upon oscillative movements of said first rotary means; and two rotary actuators connected to operate said first and second rotary means alternatively to alternatively immobilize and advance said strip.

13. A combination as set forth in claim 12 in which said two actuators are two co-axial rotary solenoids on said given axis operatively connected to said two rotary means respectively.

14. A combination as set forth in claim 12 in which said first rotary means is a rotary cam and which includes a follower cooperative with the cam and operatively connected to said strip engaging means for operation thereof; and which includes means to guide said follower along a path radially of said axis.

15. A mechanism for intermittently advancing a ribbon-like strip having sprocket holes therein, comprising: a strip advancing claw member mounted to be rotatable about a given pivot axis through a given angular range from a rearward position to a forward position to advance the strip, said claw member being extensible and retractable laterally of said axis for engagement and disengagement with the strip; pilot pin means movable between an extended position in engagement with the strip to immobilize the strip and a retracted position to free the strip; oscillatory rotary control means mounted to be oscillative about said given pivot axis with means connecting said claw member and said pin means to said control means to effect guided movement of said claw member and said pin means upon oscillation of said control means about said given pivot axis from a first position to a second position to extend said claw member and retract said pin means, and in the opposite direction from said second position to said first position to retract said claw member and extend said pin means; and means to rotate said claw member and said rotary control means alternately in opposite directions to carry out an operating cycle of four stages to advance the strip, the four stages comprising, respectively, rotation of said claw member from its forward position to its rearward position while said rotary control means is at its first position; rotation of said rotary control means from its first position to its second position while said claw member is at its rearward position to extend said claw member and retract said pilot pin means; return rotation of said claw member from its rearward position to its forward position while said rotary control means is at its second position to advance said strip; and return rotation of said rotary control means from its second position to its first position while said claw member is at its forward position to retract said claw member and to extend said pilot pin means into engagement with said strip.

References Cited in the file of this patent

UNITED STATES PATENTS

| | | |
|---|---|---|
| 1,850,955 | Fear | Mar. 22, 1932 |
| 1,912,535 | Mitchell | June 6, 1933 |
| 2,408,528 | Nassour | Oct. 1, 1946 |
| 2,451,452 | Thunberg | Oct. 12, 1948 |
| 2,506,649 | Reeves | May 9, 1950 |
| 2,588,813 | Dube | Mar. 11, 1952 |
| 2,607,262 | Larson | Aug. 19, 1952 |
| 2,649,015 | Nassour | Aug. 18, 1953 |

FOREIGN PATENTS

| | | |
|---|---|---|
| 244,081 | Great Britain | May 13, 1926 |
| 702,691 | Great Britain | Jan. 20, 1954 |
| 640,188 | Germany | Dec. 24, 1936 |
| 854,881 | Germany | Nov. 6, 1952 |